(12) United States Patent
Mazuy

(10) Patent No.: US 6,644,915 B2
(45) Date of Patent: Nov. 11, 2003

(54) NUCLEAR POWER STATION PRIMARY PUMP

(75) Inventor: Louis Mazuy, Maubeuge (FR)

(73) Assignee: Jeumont S.A., Courbevoie (FR)

(*) Notice: Subject to any disclaimer, the term of this patent is extended or adjusted under 35 U.S.C. 154(b) by 8 days.

(21) Appl. No.: 10/094,631

(22) Filed: Mar. 12, 2002

(65) Prior Publication Data

US 2002/0127098 A1 Sep. 12, 2002

(30) Foreign Application Priority Data

Mar. 12, 2001 (FR) ............................................ 01 03335

(51) Int. Cl.⁷ ............................................. F04D 29/58
(52) U.S. Cl. ..................... 415/175; 415/177; 415/174.5; 415/230; 165/134.1; 165/135; 376/203; 376/261; 376/405; 376/451
(58) Field of Search ................................ 415/175, 176, 415/177, 178, 174.5, 230; 165/134.1, 135; 376/203, 261, 404, 405, 451

(56) References Cited

U.S. PATENT DOCUMENTS 3,732,029 A * 5/1973 Raymond et al. ............ 415/176
6,328,541 B1 * 12/2001 Veronesi et al. ............. 376/404

FOREIGN PATENT DOCUMENTS

| DE | 1017320 | 10/1957 | | |
|---|---|---|---|---|
| DE | 2013963 | 10/1970 | | |
| EP | 0018266 | 10/1980 | | |
| FR | 1038026 | 9/1953 | | |
| FR | 2384971 | 10/1978 | | |
| FR | 2647854 | 12/1990 | | |
| GB | 935464 A | * | 8/1963 | ............... 165/134.1 |

OTHER PUBLICATIONS

French Search Report dated Oct. 2001, No. FA 604446, pp. 1–2.

* cited by examiner

Primary Examiner—Christopher Verdier
(74) Attorney, Agent, or Firm—Connolly Bove Lodge & Hutz LLP

(57) ABSTRACT

There is provided a nuclear power station primary pump of the type comprising a drive shaft for rotating a wheel, a heat exchanger, a thermal barrier cover comprising a peripheral skirt provided at its base with a circular end wall, and a diffuser comprising a peripheral skirt provided at its base with a rim. The circular end wall co-operates with the base of the heat exchanger to define a bottom chamber for cold water and includes a central bore provided with a succession of circumferential and superposed rings forming a lip seal of the labyrinth type, and a space is formed between the thermal barrier cover and the diffuser to maintain stagnant cooling fluid.

5 Claims, 2 Drawing Sheets

NUCLEAR POWER STATION PRIMARY PUMP

The present invention relates to a nuclear power station primary pump.

BACKGROUND OF THE INVENTION

A primary pump in a nuclear power station comprises a drive shaft for rotating a wheel, and above the wheel and concentrically about the shaft, a heat exchanger forming a thermal barrier, a thermal barrier cover having a peripheral skirt provided at its base with a circular end wall extending beneath the heat exchanger, and a pump diffuser having a peripheral skirt concentric with the peripheral skirt of the thermal barrier cover and provided at its base with a rim extending beneath the circular end wall of the body.

This type of primary pump also has a ring known as a "labyrinth" ring placed between the heat exchanger and the shaft, and a body having the heat exchanger and the peripheral skirt of the thermal barrier cover fixed thereto. This body is connected to the thermal barrier cover by link elements.

Until now, the circular end wall of the thermal barrier cover has extended immediately beneath the bottom portion of the heat exchanger and has co-operated with the rim of the diffuser to define a bottom chamber for cold water.

In addition, the rim of the diffuser has had a central bore for passing the shaft and has been provided with a succession of circumferential and superposed rings forming a lip seal of the labyrinth type.

That disposition presents drawbacks.

The diffuser rim carrying the lip seal of the labyrinth type is placed in the transition zone between the hot water of the primary circuit which is at a temperature of about 300° C. and the cooled zone of the pump which is at a temperature of about 40° C.

The diffuser rim, and consequently also the labyrinth type seal, are both subjected to a large temperature gradient which encourages thermal fatigue cracks to form on the lips of the seal.

OBJECTS AND SUMMARY OF THE INVENTION

An object of the invention is to avoid those drawbacks by proposing a nuclear power station primary pump in which the distribution of temperatures at the labyrinth type lip seal between the hot water of the primary circuit and the cooled zone is modified in such a way as to reduce crack formation in the seal.

The invention thus provides a nuclear power station primary pump of the type comprising firstly a drive shaft for rotating a wheel and, above said wheel and concentrically about said shaft, a heat exchanger forming a thermal barrier, a thermal barrier cover comprising a peripheral skirt provided at its base with a circular end wall extending beneath the heat exchanger, and a diffuser comprising a peripheral skirt provided at its base with a rim extending beneath the circular end wall of the thermal barrier cover, and secondly a body having fixed thereto the heat exchanger and the peripheral skirt of the thermal barrier cover, wherein the circular end wall of the thermal barrier cover co-operates with the base of the heat exchanger to define a bottom chamber for cold water and includes a central bore provided with a succession of circumferential and superposed rings forming a lip seal of the labyrinth type, and wherein the circular end wall cooperates both with the peripheral skirt of the thermal barrier cover and with the rim of the peripheral skirt of the diffuser to define clearance forming a space for maintaining stagnant cooling fluid.

According to other characteristics of the invention:

the circular end wall has vertical ribs subdividing the bottom chamber into a plurality of compartments;

the free end of each rib includes facing, and the facings together form a circular sector for centering a ring placed between the shaft and the heat exchanger;

a sealing ring is interposed between the top edge of the peripheral skirt of the thermal barrier cover and the end wall of the body; and the circular end wall of the thermal barrier cover includes a zone of reduced thickness between the bore and the peripheral skirt.

BRIEF DESCRIPTION OF THE DRAWINGS

The characteristics and advantages of the invention appear from the following description given by way of example and made with reference to the accompanying drawings, in which.

MORE DETAILED DESCRIPTION

Figure 1:
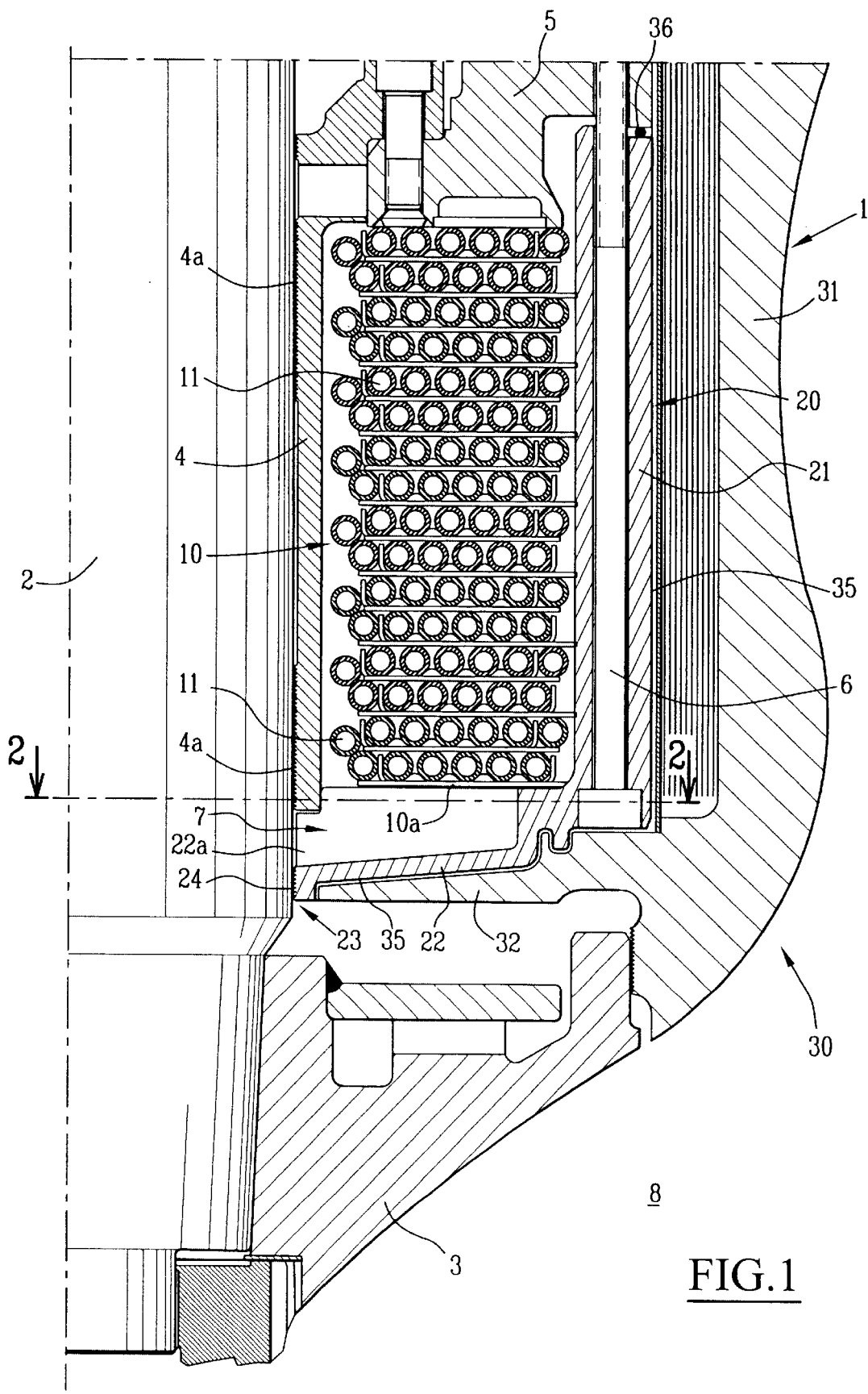
FIG. 1 is a diagrammatic half-axial section view of a portion of a primary pump in accordance with the invention.

FIG. 1 is a diagram showing a portion of a primary pump in a nuclear power station, which pump is a single-stage pump of the helico-centrifugal type with vertical suction and horizontal delivery.

The pump is given overall reference 1 and comprises a drive shaft 2 for rotating a wheel 3 which is fixed by appropriate means to the base of said shaft 2. The pump 1 also comprises, above the wheel 3 and concentrically about the shaft 2, a heat exchanger 10 forming a thermal barrier, a thermal barrier cover 20, and a diffuser 30.

The heat exchanger 10 comprises a multitude of concentric tubes 11 distributed in superposed sheets, and a ring 4 is disposed between the shaft 2 and the heat exchanger 10.

On the inside, near its top and bottom portions, the ring 4 carries respective mechanical seals 4a of the labyrinth type.

The thermal barrier cover 20 is formed by a peripheral skirt 21 extending over the full height of the heat exchanger 10 and provided at its base with a circular end wall 22 extending beneath said heat exchanger 10.

The diffuser 30 is formed by a peripheral skirt 31 surrounding the peripheral skirt 21 of the thermal barrier cover 20 and provided at its base with a rim 32 extending beneath the circular end wall 22 of said thermal barrier cover 20.

The primary pump 1 also comprises a body 5 having fixed thereto the heat exchanger 10 and the peripheral skirt 21 of the thermal barrier cover 20.

The skirt 21 of the thermal barrier cover 20 is fixed to the body 5 by link elements 6, constituted by studs, for example.

As shown in FIG. 1, the circular end wall 22 of the thermal barrier body 20 co-operates with the base 10a of the heat exchanger 10 to define a bottom chamber for cold water that is given overall reference 7.

The circular end wall 22 of the thermal barrier body 20 is provided with a central bore 23 for passing the shaft 2 and which includes a succession of circumferential and superposed rings forming a lip seal 24 of the labyrinth type.

Figure 2:
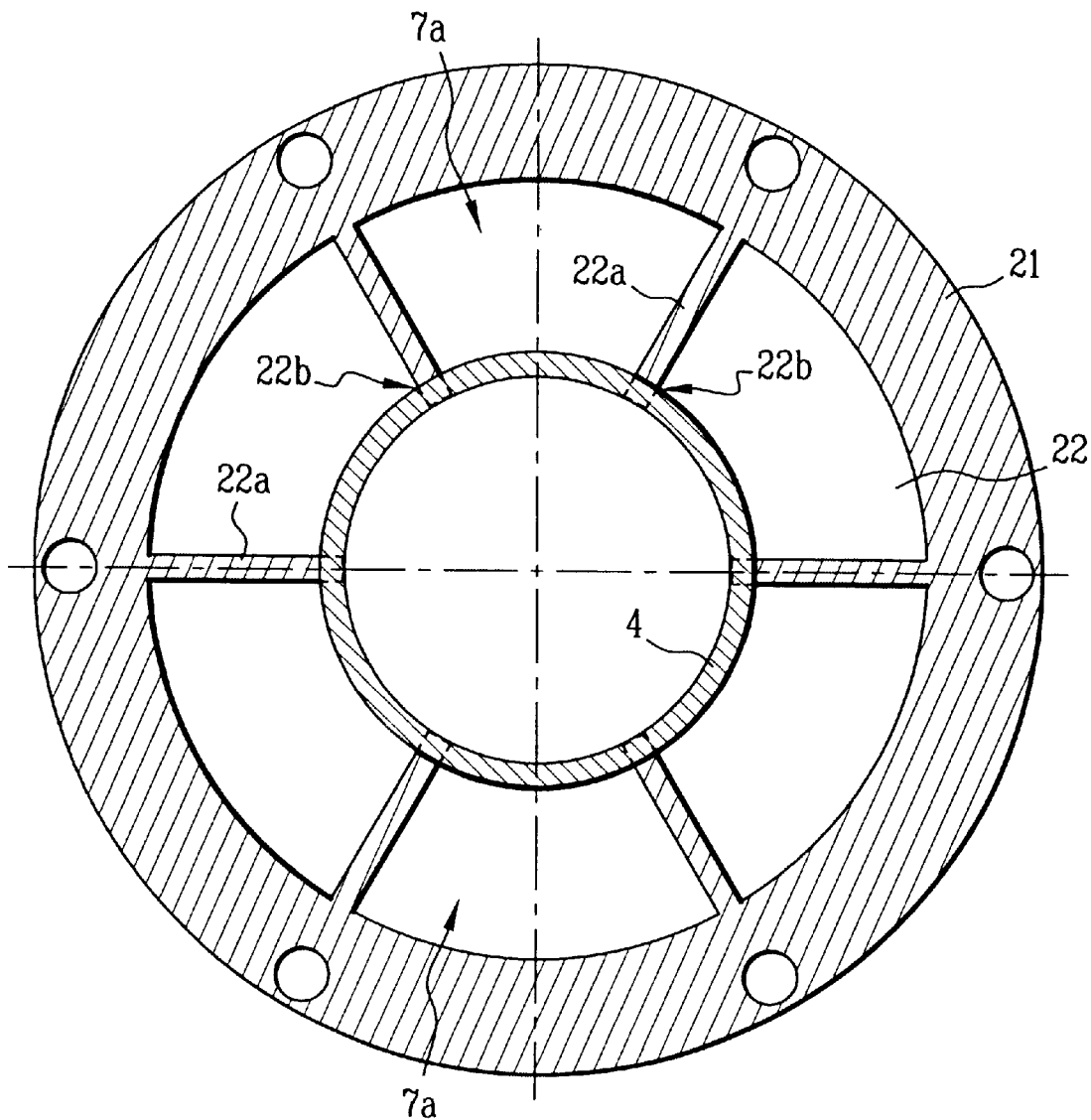
FIG. 2 is a section view on line 2—2 of FIG. 1.

In addition, the circular end wall 22 has vertical ribs 22a (FIG. 2) extending towards the heat exchanger 10. These ribs 22a are disposed radially, they are equidistant, and they subdivide the chamber 7 into a plurality of compartments 7a.

The free end of each rib 22a includes a facing 22b, and together the facings 22b form a circular sector for receiving the bottom end of the ring 4 and for centering the ring 4.

Finally, the ribs 22a provide the circular end wall 22 with strength to withstand bending.

Furthermore, the circular end wall 22 co-operates both with the peripheral skirt 21 of the thermal barrier cover 20 and with the rim 32 of the peripheral skirt 31 of the diffuser 30 to define clearance between them, which clearance forms a space 35 for maintaining stagnant cooling fluid.

A sealing ring 36 is interposed between the top edge of the peripheral skirt 21 of the thermal barrier cover 20 and the body 5 so as to avoid hot water intruding into the heat exchanger 10 in normal operation and also while the pump is stopping and starting, and even in the event of an interruption in the cold water feed to the pump.

In a variant, the circular end wall 22 of the thermal barrier cover 20 includes a zone of reduced thickness (not shown) between the bore 23 and the peripheral skirt 21.

In conventional manner, the wheel 3 constrained to rotate with the shaft 2 sucks in the primary circuit fluid, and this fluid is delivered via a delivery orifice 8, a portion of which is shown in FIG. 1 and which is situated beside the diffuser 30.

The diffuser 30 is thus in contact with the fluid of the primary circuit which is at a temperature of about 300° C.

The heat exchanger 10 which forms a thermal barrier and a cold water feed limits the transmission of heat from the hot water of the primary circuit, so the temperature of the water in the bottom chamber 7 is about 40° C.

Because of this distribution of temperatures around the lip seal 24 and because this seal is made directly on the end wall of the thermal barrier cover 20 which is isolated from the diffuser 30 in contact with the hot water of the primary circuit, the risks of cracks forming on the rings of the seal 24 are considerably reduced.

These modifications ensure a very considerable improvement in the values of the stress intensity factor when the labyrinth type lip seal is subjected to maximum stress levels.

By way of example, the maximum value calculated for pumps used in 1300 megawatt (MW) nuclear power stations is less than one-third of the usual criterion to be complied with for the material used.

What is claimed is:

1. A nuclear power station primary pump comprising: firstly a drive shaft for rotating a wheel and, above said wheel and concentrically about said shaft a heat exchanger forming a thermal barrier, a thermal barrier cover comprising a peripheral skirt provided at its base with a circular end wall extending beneath the heat exchanger, and a diffuser comprising a peripheral skirt provided at its base with a rim extending beneath the circular end wall of the thermal barrier cover, and secondly a body having fixed thereto the heat exchanger and the peripheral skirt of the thermal barrier cover, wherein the circular end wall of the thermal barrier cover co-operates with the base of the heat exchanger to define a bottom chamber for cold water and includes a central bore provided with a succession of circumferential and superposed rings forming a lip seal of the labyrinth type, and wherein the circular end wall cooperates both with the peripheral skirt of the thermal barrier cover and with the rim of the peripheral skirt of the diffuser to define clearance forming a space for maintaining stagnant cooling fluid.

2. A primary pump according to claim 1, wherein the circular end wall has vertical ribs subdividing the bottom chamber into a plurality of compartments.

3. A primary pump according to claim 2, wherein the free end of each rib includes facing, and wherein the facings together form a circular sector for centering a ring placed between the shaft and the heat exchanger.

4. A primary pump according to claim 1, wherein a sealing ring is interposed between the top edge of the peripheral skirt of the thermal barrier cover and an end wall of the body.

5. A primary pump according to claim 1, wherein the circular end wall of the thermal barrier cover includes a zone of reduced thickness between the bore and the peripheral skirt.

* * * * *